United States Patent
Toyota et al.

(10) Patent No.: US 6,759,448 B2
(45) Date of Patent: Jul. 6, 2004

(54) FLEXIBLE POLYURETHANE FOAM, ITS PRODUCTION METHOD AND MATERIAL SYSTEM FOR ITS PRODUCTION

(75) Inventors: Yoshinori Toyota, Yokohama (JP); Hiroshi Wada, Kashima-gun (JP); Etsuko Akagi, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 100 days.

(21) Appl. No.: 10/211,585

(22) Filed: Aug. 5, 2002

(65) Prior Publication Data

US 2003/0114550 A1 Jun. 19, 2003

(30) Foreign Application Priority Data

Aug. 6, 2001 (JP) ........................................ 2001-238125

(51) Int. Cl.[7] .............................................. C08G 18/28
(52) U.S. Cl. ........................ 521/174; 521/130; 521/131; 521/170
(58) Field of Search ................................ 521/130, 131, 521/170, 174

(56) References Cited

U.S. PATENT DOCUMENTS

| | | | |
|---|---|---|---|
| 3,142,515 A | 7/1964 | Wall et al. | |
| 5,093,380 A | 3/1992 | Takeyasu et al. | |
| 5,100,922 A | 3/1992 | Wada et al. | |
| 5,437,822 A | 8/1995 | Wada et al. | |
| 6,201,035 B1 | 3/2001 | Tuinman et al. | |
| 6,313,060 B1 | 11/2001 | Sugiyama et al. | |

FOREIGN PATENT DOCUMENTS

| | | |
|---|---|---|
| JP | 5-320304 | 12/1993 |
| JP | 11-322875 | 11/1999 |
| WO | WO 01/79323 | 10/2001 |
| WO | WO 01/90209 | 11/2001 |

*Primary Examiner*—John M. Cooney, Jr.
(74) *Attorney, Agent, or Firm*—Oblon, Spivak, McClelland, Maier & Neustadt, P.C.

(57) ABSTRACT

A flexible polyurethane foam, wherein in a load (N)-deflection (mm) loop obtained by a load test of the flexible polyurethane foam, the X value as calculated from the formula (1) is at most 4.2:

$X$=(static spring constant at a load of 883N)/(static spring constant at a load of 98N)     (1)

27 Claims, 1 Drawing Sheet

FLEXIBLE POLYURETHANE FOAM, ITS PRODUCTION METHOD AND MATERIAL SYSTEM FOR ITS PRODUCTION

The present invention relates to a flexible polyurethane foam, its production method and a material system for its production.

In recent years, along with progress in an automobile industry, not only improvement in performance of an automobile but also a high degree of vehicle interior and improvement in interior comfort have been desired, and development of a flexible polyurethane foam for seat (hereinafter referred to as a flexible foam) having more excellent cushioning properties has been strongly desired in view of improvement in comfort to sit on and comfort to ride in.

Heretofore, as a seat cushion, a combination of metal springs and a pad material comprising a flexible foam has been used widely. However, in recent years, a seat for an automobile so-called full-foam type, wherein a flexible foam itself is made to have spring properties so that metal springs are not used, tends to be employed, with a demand for cost saving, weight saving, etc. The full-foam type seat tends to be thick since no metal spring is used together, and properties of the flexible foam are factors which greatly contribute to comfort to sit on and comfort to ride in of the seat. Namely, importance has been given to static characteristics and dynamic characteristics as indices of comfort to sit on and comfort to ride in, in development of a flexible foam. Particularly among the static characteristics, control of the feeling of support at the initial stage of sitting and the feeling of bottom out at the terminal stage of sitting are important.

Figure 2:
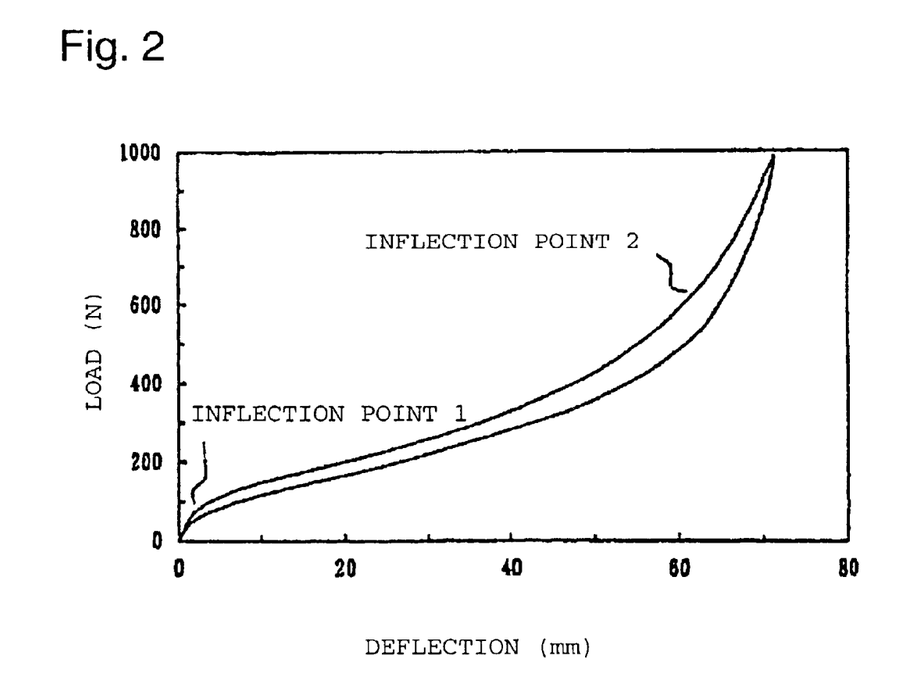
FIG. 2 is one example of a load-deflection loop of a conventional flexible polyurethane foam.

When a person actually sits on a seat equipped with a pad material made of a flexible foam, the flexible foam is compressed and indented, and the position of e.g. the bottom falls to a certain height. As a method of measuring the static characteristics (static seat feeling), a load test in accordance with a performance test method of a pad material for a seat for an automobile in JASO (Japanese Automobile Standards Organization) B408-89, wherein a deflection is measured to obtain a load-deflection loop, is used. In FIG. 2 is shown a load-deflection loop of a conventional flexible foam. In the load-deflection loop, the value of the tangent of the tangent line at the pressing side (upper side in FIG. 2) at each load is the static spring constant. Namely, when the static spring constant is high, the curve has a steep slope and when the static spring constant is low, the curve has a gentle slope.

The load-deflection loop of a flexible foam usually rises quickly at the initial stage of application of the load, then gently increases at the inflection point 1 and with further application of the load, it rapidly increases at the inflection point 2. A flexible foam excellent in the feeling of support is considered to be such a flexible foam that the curve steeply rises at the initial stage of application of the load, and the static spring constant is high from the starting point to the vicinity of the inflection point 1. Further, a flexible foam which provides no feeling of bottom out and provides favorable comfort to sit on, is considered to be such a flexible foam that the static spring constant is low even in the high load region after the inflection point 2. Adjustment of hardness of the flexible foam has conventionally been carried out to obtain the feeling of support, however, in such a case, the static spring constant in the high load region tends to be high, and the feeling of bottom out can not be overcome.

Generally, a full-foam type flexible foam for seat provides a small deflection in the high load region as the static characteristics, it provides the feeling of bottom out, and the comfort to sit on tends to deteriorate, as compared with the foam for seat in combination with metal springs. In order to overcome such problems, a method has been known to make the foam thick or to increase the density to make the deflection large, however, problems of increase in cost and increase in the seat weight can not be overcome.

JP-A-11-322875 proposes a method of adding a specific fluorine type surfactant to a material for production of a polyurethane foam composed mainly of a polyol and an isocyanate component so as to increase the deflection. However, there are such problems that the feeling of support is insufficient, the fluorine type surfactant itself is expensive, thus increasing the cost, and the surface tension of the surfactant is low, whereby the inside of a mold at the time of foam production may be polluted.

Further, JP-A-5-320304 proposes a method for producing a polyurethane foam, which comprises reacting a polyol component comprising a polyol, a catalyst, a blowing agent and other additives, with a polyisocyanate component, wherein a specific bifunctional secondary amine is added, to produce a foam which provides a small slope of the pressing side curve at 75% deflection as a characteristic to evaluate the feeling of bottom out, which provides no feeling of bottom out, and which has a well balance among softness, degree of falling and vibrating property. However, the feeling of support is insufficient, and durability particularly heat and humid permanent compression set is insufficient.

Namely, such a flexible foam is not present that the static spring constant is high in the low load region, the feeling of support and rigidity are satisfied, and further, the static spring constant is low in the high load region, the deflection is large and the feeling of bottom out is overcome.

Under these circumstances, it is an object of the present invention to provide a flexible foam for an automobile seat, with which the feeling of bottom out is overcome, the feeling of support is favorable, and the comfort to sit on is significantly improved, and which has favorable vibrating property and durability, and a method for producing said foam and a material system for production of said foam.

Figure 1:
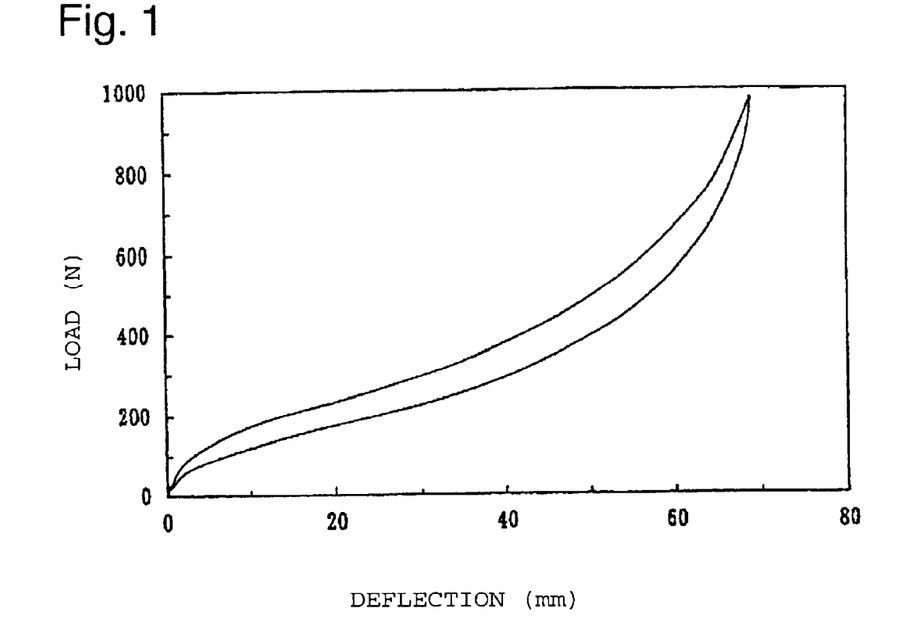
FIG. 1 is one example of a load-deflection loop of the flexible polyurethane foam of the present invention.

The present inventors have conducted extensive studies to overcome the above problems and as a result, they have found a foam which exhibits a load-deflection loop which satisfies characteristic conditions in a load test of the flexible foam or in a load test of its core portion, and found that a foam having such a characteristic load-deflection loop significantly improves the comfort to sit on as the static seat feeling, when an automobile seat is molded (see FIG. 1). A foam which satisfies such conditions has such characteristics that the deflection is small at the initial stage of application of the load, the feeling of support is sufficient, and after that region, the rate of change of the static spring constant is small, and the curve gently increases. Namely, it is estimated that at the initial stage of sitting, the feeling of support is sufficient, whereby the foam is excellent in body weight support, and after a person sits on the foam, it is well bent, whereby the body weight is softly supported, and accordingly the feeling of bottom out is overcome, and the comfort to sit on becomes favorable.

Namely, the present invention provides a flexible polyurethane foam, wherein in a load (N)-deflection (mm) loop obtained by a load test of the flexible polyurethane foam, the X value as calculated from the formula (1) is at most 4.2:

$$X = (\text{static spring constant at a load of 883N})/(\text{static spring constant at a load of 98N}) \quad (1)$$

The present invention further provides a flexible polyurethane foam, wherein in a load (N)-deflection (mm) loop obtained by a load test of a core portion of the flexible polyurethane foam, the Y value as calculated from the formula (2) is at most 1.8:

$$Y=\text{(static spring constant at a load of 127.4N)/(static spring constant at a load of 19.6N)} \quad (2)$$

The present invention further provides a method for producing the above flexible polyurethane foam, which comprises reacting a polyol having from 5 to 85 mass % of an oxyethylene/oxypropylene random chain, the oxyethylene group content in the random chain being from 3 to 40 mass % and the content of the terminal oxyethylene block chain being from 3 to 40 mass %, and having a hydroxyl value of from 10 to 56 mgKOH/g and a degree of unsaturation of at most 0.04 meq/g, with a polyisocyanate in the presence of a blowing agent and a catalyst.

Still further, the present invention provides a material system for production of the above flexible polyurethane foam, which comprises a polyol system liquid containing a polyol having from 5 to 85 mass % of an oxyethylene/oxypropylene random chain, the oxyethylene group content in the random chain being from 3 to 40 mass % and the content of the terminal oxyethylene block chain being from 3 to 40 mass %, and having a hydroxyl value of from 10 to 56 mgKOH/g and a degree of unsaturation of at most 0.04 meq/g, and a polyisocyanate.

Now, the present invention will be described in detail with reference to preferred embodiments.

The load test in the present invention is a test in accordance with a performance test method of a pad material for an automobile seat of JASO (Japanese Automobile Standards Organization) B408-89. As a pressing plate, a disc having a diameter of 200±2 mm and a thickness of from 50 to 100 mm is used. A test specimen is put on a horizontal stand of a testing apparatus, and the pressing plate attached to the testing apparatus is put on the center portion on the topside of the test specimen. As preliminary compression, the test specimen is once compressed with a load of 700N, then the load is removed and the test specimen is left to stand for from 3 to 5 minutes, and then an initial load of 5N is applied and the thickness (t0) is measured, which is taken as the initial thickness. The center point on the pressed side at that time is taken as the starting point, the load meter is set to 0, and pressing and removal of pressing are carried out at a rate of from 150 to 300 mm/min, and the deflection relative to the load is measured. From the measurement result, a load-deflection loop as shown in FIG. 1, with respect to the relation between the load and deflection, is prepared. As the test specimen, a box mold overall test piece (size: 400 mm lengthwise and breadthwise and 100 mm in thickness) (released from a box mold, the skin layer of which not removed) for measurement of basic physical properties of a foam or a core portion (100 m lengthwise and breadthwise and 50 mm in thickness) of the foam is used. The core portion is a test specimen punched out in a size of 100 mm lengthwise and breadthwise and 50 mm in thickness, from the center portion of the box mold test piece. Further, physical property values of a test specimen in a size of 100 mm lengthwise and breadthwise and 50 mm in thickness, punched out from an actual molded foam for a seat cushion, are substantially the same as the physical property values of the test specimen cut out from the above test piece, and accordingly the above test specimen may be used as a test specimen at the core portion.

The static spring constant is a value of the tangent of the tangent line on the pressing side at each load in the load-deflection loop.

The flexible foam of the present invention is characterized by having, in the load (N)-deflection (mm) loop obtained by the load test, an X value as calculated from the formula (1) of at most 4.2:

$$X=\text{(static spring constant at a load of 883N)/(static spring constant at a load of 98N)} \quad (1)$$

Otherwise, the flexible foam of the present invention is characterized by having, in a load (N)-deflection (mm) loop obtained by a load test of a core portion, a Y value as calculated from the formula (2) of at most 1.8:

$$Y=\text{(static spring constant at a load of 127.4N)/(static spring constant at a load of 19.6N)} \quad (2)$$

The static spring constant at a load of 883N is a value of the tangent of the tangent line at the pressing side when the load is 883N in the obtained load-deflection loop. Similarly, the static spring constant at a load of 98N, the static spring constant at a load of 127.4N and the static spring constant at a load of 19.6N are values of the tangent of the tangent line at the pressing side when the loads are 98N, 127.4N and 19.6N, respectively, in the obtained load-deflection loop.

The static spring constant in the low load region in the vicinity of the load of 98N, has an impact on the comfort to sit on of an automobile seat in the initial stage of sitting. The static spring constant in the vicinity of the load of 98N is preferably high, whereby the feeling of support is likely to be obtained, and the comfort to sit on at the initial stage of sitting tends to be favorable. Further, the static spring constant in the high load region in the vicinity of the load of 883N has an impact on the feeling of bottom out. The static spring constant in the vicinity of the load of 883N is preferably low, whereby the deflection is large, the feeling of bottom out tends to be overcome, and the comfort to sit on tends to be favorable.

The present invention is characterized in that the X value in the formula (1) is at most 4.2. With respect to the load-deflection loop of a flexible foam which satisfies this range of the X value, the curve quickly rises in the low load region in the vicinity of the load of 98N, and the static spring constant is high. Then, the rate of change of the static spring constant is low, the curve gently increases, and the rate of increase of the static spring constant is low in the vicinity of the load of 883N. Namely, as the static spring constant in the low load region is high, the feeling of support is likely to be obtained, and as the static spring constant in the high load region is low, the deflection is large, the feeling of bottom out can be overcome, and favorable comfort to sit on can be obtained. The X value of the flexible foam is more preferably at most 4.1, furthermore preferably at most 4.0, most preferably at most 3.9.

Since an actual seat cushion is different in size and thickness depending on its portion in general, the values vary depending upon the measurement portion even in the same sample, and accordingly it has been difficult to compare samples of different types with different shapes. Accordingly, the present inventors have found a method to make it possible to compare samples having any shape, by measuring the load-deflection loop of the core portion of the flexible foam. They have further found that a flexible foam which provides excellent comfort to sit on may satisfy specific conditions in the load-deflection loop of the core portion of the flexible foam. That is, the present invention is characterized in that the Y value in the formula (2) is at most 1.8.

With respect to the core portion of the flexible foam, the static spring constant in the low load region in the vicinity of the load of 19.6N has an impact on the comfort to sit on at the initial stage of sitting of an automobile seat. The static spring constant in the vicinity of the load of 19.6N is preferably high, whereby the feeling of support is likely to be obtained and the comfort to sit on in the initial stage of sitting tends to be favorable. Further, the static spring constant in the high load region in the vicinity of the load of 127.4N has an impact on the feeling of bottom out. The static spring constant in the vicinity of the load of 127.4N is preferably low, whereby the deflection is large, the feeling of bottom out is likely to be overcome, and the comfort to sit on tends to be good.

With respect to the load-deflection loop of a flexible foam having a Y value of at most 1.8, the curve quickly rises in the low load region in the vicinity of the load of 19.6N, and the static spring constant is high. After that region, the rate of change of the static spring constant is low, the curve gently increases, and the rate of increase of the static spring constant is small to the vicinity of the load of 127.4N. Namely, as the static spring constant in the low load region is high, the feeling of support is likely to be obtained, and as the static spring constant in the high load region is low, the deflection is large, the feeling of bottom out is likely to be overcome, and favorable comfort to sit on is likely to be obtained. The Y value of the flexible foam is more preferably at most 1.75, furthermore preferably at most 1.7, most preferably at most 1.68.

The present inventors have further found that tendencies of the shape of the load-deflection loop of the core portion of the flexible foam and the load-deflection loop of the box mold overall test piece are substantially the same. Accordingly, it is possible to analogize the load-deflection loop of the box mold overall test piece by measuring the load-deflection loop of the core portion of the flexible foam according to the present invention. Further, it is also possible to analogize comfort to sit on when a seat cushion is molded by using a material system from which such test specimen are produced, and accordingly the above method is very useful.

The flexible foam having an X value as calculated from the formula (1) of at most 4.2 and the flexible foam having a Y value as calculated from the formula (2) of at most 1.8 of the present invention may be produced, for example, as follows.

The flexible foam of the present invention can be produced by reacting a polyol containing a polyol (Z) as described hereinafter with a polyisocyanate compound in the presence of a blowing agent and a catalyst, by using a crosslinking agent, a foam stabilizer and another additive as the case requires.

The above polyol (Z) is a polyoxyalkylene polyol having from 5 to 85 mass % of an oxyethylene/oxypropylene random chain, the content of oxyethylene groups in the random chain being from 3 to 40 mass % and the content of the terminal oxyethylene block chain being from 3 to 40 mass %, and having a hydroxyl value of from 10 to 56 mgKOH/g and a degree of unsaturation of at most 0.04 meq/g.

Heretofore, it has been difficult to produce a foam which satisfies the X value of the formula (1) of at most 4.2 or a foam which satisfies the Y value of the formula (2) of at most 1.8 by using a conventional polyol alone. However, by using the above polyol (Z) which is a polyol having a low degree of unsaturation and having a random chain, a flexible foam which satisfies the above condition and which is excellent in comfort to sit on, can easily be obtained.

The polyol (Z) of the present invention is a polyoxyalkylene polyol obtained by subjecting alkylene oxides to ring-opening addition polymerization with an initiator in the presence of a ring-opening addition polymerization catalyst.

Examples of the initiator include polyhydric alcohols such as ethylene glycol, propylene glycol, 1,4-butanediol, glycerol, trimethylolpropane, pentaerythritol, diglycerol, meso-erythritol, methylglucoside, glucose and sorbitol; amines such as ethylenediamine, diethylenediamine, triethylenediamine, diaminodiphenylmethane, hexamethylenediamine and propylenediamine; and condensed type compounds such as a phenol resin and a novolak resin. These active hydrogen compounds may be used in combination as a mixture of at least two, or may be used together with an active hydrogen compound having at least seven active hydrogen such as sucrose. Among such active hydrogen compounds, a polyhydric alcohol is preferred. Further, a compound obtained by subjecting an alkylene oxide such as propylene oxide to ring-opening addition with the above initiator may also be used as the initiator.

The alkylene oxides to be subjected to ring-opening addition polymerization with the initiator may, for example, be ethylene oxide, propylene oxide, 1,2-butylene oxide, 2,3-butylene oxide, epichlorohydrin or styrene oxide, however, at least ethylene oxide and propylene oxide are used together for production of the polyol (Z).

As the ring-opening addition polymerization catalyst used for production of the polyol (Z), a conventionally known catalyst with which a polyoxyalkylene polyol having a low degree of unsaturation is obtained may be used, and it may, for example, be a cesium type catalyst, a double metal cyanide complex catalyst or a phosphazene type compound catalyst.

Among them, a double metal cyanide complex catalyst is preferred. When a double metal cyanide complex catalyst is used, a polyol having a low degree of unsaturation can be obtained. A flexible foam excellent in durability can be obtained by using a polyol having a low degree of unsaturation as the material.

As the double metal cyanide complex, a complex containing zinc hexacyanocobaltate as the main component is preferred, and its ether and/or alcohol complex is preferred. Its composition is essentially as disclosed in JP-B-46-27250. As the ether, e.g. monoethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME) are preferred. As the alcohol, tert-butyl alcohol as disclosed in JP-A-4-145123 is preferred.

The cesium type catalyst may, for example, be a cesium metal, a cesium alkoxide such as cesium methoxide, cesium hydroxide or cesium carbonate.

The polyol (Z) has a random chain in its molecule, and has an oxyethylene block chain at its terminal. The random chain is an addition structure obtained by randomly adding at least two types of alkylene oxides in a predetermined proportion. Hereinafter the polyol having the random chain will be referred to as a random polyol. Further, the block chain is an addition structure obtained by adding an alkylene oxide alone.

The polyol (Z) has, as a random chain, a random chain (oxyethylene/oxypropylene random chain) obtained by randomly adding ethylene oxide and propylene oxide in a predetermined proportion. When a polyol having an oxyethylene/oxypropylene random chain is used as the material, moldability at the time of production of a flexible foam tends to be particularly favorable. Further, when the above double metal cyanide complex catalyst is used as the catalyst for production of an oxyethylene/oxypropylene random chain, a random polyol having a low degree of unsaturation can be produced. The random polyol having a low degree of unsaturation is more preferred in view of favorable durability in addition to favorable moldability.

The content of the random chain in the polyol (Z) is from 5 to 85 mass %, preferably from 10 to 80 mass %, based on the entire polyol molecule. When the content of the random chain is within the above range, not only the moldability of the flexible foam tends to be favorable, but also the feeling of support is likely to be obtained.

The content of oxyethylene groups in the oxyethylene/oxypropylene random chain in the polyol (Z) is from 3 to 40 mass %, preferably from 5 to 20 mass %.

The polyol (Z) may have an oxypropylene block chain produced by using a double metal cyanide complex catalyst in addition to the random chain. When the random polyol has an oxypropylene block chain, hardness of the flexible foam is likely to be obtained, such being favorable. In such a case, the oxypropylene block chain is preferably adjacent to the portion derived from the initiator, whereby moldability at the time of production of the foam tends to be favorable. The content of the oxypropylene block chain in the polyol molecule is preferably from 1 to 50 mass %, more preferably from 1 to 35 mass % in such a viewpoint that more favorable moldability can be obtained. Here, even when the polyol has an oxypropylene block chain, if it is not produced by using a double metal cyanide complex catalyst, the chain is distinguished from the above oxypropylene block chain.

The polyol (Z) has an oxyethylene block chain at its terminal. The polyol having an oxyethylene block chain at its terminal can be obtained in such a manner that an alkylene oxide is added to an initiator by using an appropriate catalyst, then ethylene oxide is added thereto by using an alkali metal catalyst such as a potassium hydroxide catalyst, and then production is completed.

In the polyol (Z), the content of the terminal oxyethylene block chain is from 3 to 40 mass %, more preferably from 5 to 30 mass %, based on the entire polyol. If the terminal oxyethylene block chain exceeds 40 mass %, contraction is likely to occur even after a crushing treatment. Further, if the terminal oxyethylene block chain is less than 3 mass %, e.g. collapses of the foam are likely to occur in production of the flexible foam, and the production tends to be difficult.

The total oxyethylene group content (i.e. the total amount of the entire oxyethylene groups contained in e.g. the portion derived from the initiator, the random chain and the oxyethylene block chain) in the polyol (Z) is preferably from 5 to 60 mass %, particularly preferably from 10 to 50 mass %. If the total oxyethylene group content is less than 5 mass %, e.g. collapses of the foam are likely to occur, and if it exceeds 60 mass %, closed cells of the foam are likely to increase, whereby the foam may be broken at the time of the crushing treatment or shrinkage is likely to occur even after the crushing treatment.

It is advantageous to use, as the polyol (Z) of the present invention, a polyol having a random chain in its molecule and having an oxyethylene block chain at its terminal, or a polyol having an oxypropylene block chain produced by using a double metal cyanide complex catalyst and a random chain in its molecule and having an oxyethylene block chain at its terminal, on the following points. When the polyol having such a structure is used, a flexible foam not only having favorable moldability, feeling of support and durability as described above but also having favorable vibrating property and the like, and well balanced in physical properties, can be obtained.

The hydroxyl value of the polyol (Z) is from 10 to 56 mgKOH/g, but is more preferably from 10 to 45 mgKOH/g. If the hydroxyl value is less than 10 mgKOH/g, the curing of the flexible foam may be insufficient in some cases. Further, if it exceeds 56 mgKOH/g, the elasticity of the flexible foam tends to be insufficient.

The number of hydroxyl groups in the polyol (Z) is preferably from 2 to 8, more preferably from 2.8 to 5.2. If the number of hydroxyl groups is less than 2, the flexible foam tends to be soft, and the permanent compression set tends to be deteriorated. Further, if the number of hydroxyl groups is larger than 8, the flexible foam tends to be hard, and mechanical properties such as elongation of the foam tend to be deteriorated.

The degree of unsaturation of the polyol (Z) used in the present invention is at most 0.04 meq/g, preferably at most 0.035 meq/g. If the degree of unsaturation exceeds 0.04 meq/g, physical properties of the flexible foam such as elongation and strength may be impaired, and the impact resilience coefficient and vibrating property as characteristics of the comfort to sit on may be deteriorated in some cases. It is considered to be attributable to the fact that the amount of an unsaturated monool contained in the polyol is large, whereby the number of hydroxyl groups substantially decreases. A polyol having a low degree of unsaturation with a degree of unsaturation of at most 0.04 meq/g can be produced by using a double metal cyanide complex catalyst.

The polyol (Z) may be used as a polymer dispersed polyol as described hereinafter.

The polyol (Z) may be used together with another polyol. The polyol (Z) is preferably at least 30 mass % in the entire polyol, particularly preferably at least 40 mass %.

As another polyol, a polyoxyalkylene polyol other than the polyol (Z), a polyester polyol or a polymer dispersed polyol having polymer fine particles stably dispersed in such a polyol, may, for example, be mentioned, and at least two types thereof may be used together. As another polyol, a polyoxyalkylene polyol other than the polyol (Z) is preferred, one containing from 40 to 85 mass % of an oxypropylene block chain is more preferred, and one containing from 50 to 75 mass % of an oxypropylene block chain is particularly preferred. Further, as said polyoxyalkylene polyol, one having no oxyethylene/oxypropylene random chain is more preferred. With respect to another polyol, the hydroxyl value is preferably from 10 to 65 mgKOH/g, particularly preferably from 20 to 45 mgKOH/g. Further, with respect to another polyol, the degree of unsaturation is preferably from 0.03 to 0.07 meq/g, particularly preferably from 0.04 to 0.065 meq/g. Said another polyol is used preferably as a polymer dispersed polyol as described hereinafter.

The polyol used in the present invention may be a polymer dispersed polyol containing polymer fine particles. The polymer dispersed polyol is a dispersion system wherein polymer fine particles (dispersoid) are stably dispersed in the base polyol (dispersion medium), and as the polymer, an addition polymerization type polymer or a condensation polymerization type polymer may be mentioned.

The polymer dispersed polyol wherein the base polyol is a conventional polyol is known, and widely used as a polyol for flexible polyurethane foam. The polymer dispersed polyol in the present invention may be produced by employing the above polyol (Z) as the base polyol, or may be produced by employing a polyol other than the polyol (Z) as the base polyol.

The polymer fine particles in the polymer dispersed polyol are composed of an addition polymerization type polymer such as a homopolymer or a copolymer of a vinyl monomer such as acrylonitrile, styrene, a methacrylate or an acrylate, or a condensation polymerization type polymer of e.g. polyester, polyurea, polyurethane or a melamine resin. Among them, preferred is an acrylonitrile/styrene copolymer. Due to the presence of the polymer fine particles, the hydroxyl value of the entire polymer dispersed polyol is usually lower than the hydroxyl value of the base polyol.

The content of the polymer fine particles in the mixed polyol is usually preferably at most 50 mass %. The amount of the polymer fine particles is not required to be particularly large. If it is too large, there may be disadvantages in view of cost and viscosity in some cases. The content is preferably from 3 to 35 mass % in many cases.

Here, physical properties (e.g. degree of unsaturation and hydroxyl value) of the polymer dispersed polyol as the polyol are those of the base polyol excluding the polymer fine particles.

The polyisocyanate compound used in the present invention may, for example, be an aromatic, alicyclic or aliphatic polyisocyanate having at least two isocyanate groups, a mixture of at least two of such polyisocyanates, or a modified polyisocyanate obtained by modification thereof. Specific examples thereof include aromatic polyisocyanates such as tolylene diisocyanate (TDI), diphenylmethane diisocyanate (MDI), polymethylene polyphenyl isocyanate (common name: crude MDI) and xylylene diisocyanate (XDI), alicyclic polyisocyanates such as isophorone diisocyanate (IPDI) and aliphatic polyisocyanates such as hexamethylene diisocyanate (HMDI), and prepolymer type modified products, isocyanate type modified products, urea modified products and carbodiimide modified products thereof. Among them, preferred are TDI, a mixture of TDI and crude MDI and prepolymer type modified products thereof.

The amount of the polyisocyanate as represented by 100 times the proportion of the number of isocyanate groups based on the total number of active hydrogen of e.g. the crosslinking agent (usually the value represented by 100 times is referred to as isocyanate index) is preferably from 80 to 120, more preferably from 85 to 110.

In the present invention, it is preferred to use as a blowing agent at least one blowing agent selected from water and inert gases. As the inert gas, specifically, the air, nitrogen or carbon dioxide gas may, for example, be mentioned. It is preferred to use only water as the blowing agent. The amount of the blowing agent is not particularly limited, and in a case where water alone is used, it is appropriately at most 10 parts by mass, particularly from 0.1 to 8 parts by mass, per 100 parts by mass of the polyol. Another blowing agent may also be used in an appropriate amount depending upon requirements of e.g. expansion ratio.

When the polyol and the polyisocyanate compound are reacted, it is required to use a catalyst. In the present invention, any catalyst which accelerates urethane formation may be used, and an amine compound or an organic metal compound may, for example, be used.

Further, in order to prevent fogging of a glass for an automobile, an amine compound having a low subliming property, an organic metal compound or a reactive amine wherein a hydroxyl group or an amino group is introduced into a part of a structure of an amine compound so that the amine compound will react with an isocyanate, may be used in a required minimum amount. Further, a polymerizing catalyst which makes isocyanate groups of e.g. a metal carboxylate be reacted, may also be used as the case requires.

The amine compound may, for example, be triethylenediamine or bis[(2-dimethylamino)ethyl]ether.

Specific examples of the reactive amine compound include dimethylethanolamine, trimethylaminoethylethanolamine (($CH_3)_2NC_2H_4N(CH_3)C_2H_4OH$) and dimethylaminoethoxyethoxyethanol (($CH_3)_2N(CH_2CH_2O)_3H$).

The amount of the amine compound type catalyst is preferably at most 1.0 part by mass, particularly preferably from 0.05 to 1.0 part by mass, per 100 parts by mass of the polyol.

The organic metal compound type catalyst may, for example, be an organic tin compound, an organic bismuth compound, an organic lead compound or an organic zinc compound, and specific examples thereof include di-n-butyltin oxide, di-n-butyltin dilaurate, di-n-butyltin, di-n-butyltin diacetate, di-n-octyltin oxide, di-n-octyltin dilaurate, monobutyltin trichloride, di-n-butyltin dialkylmercaptan and di-n-octyltin dialkylmercaptan.

The amount of the organic metal compound type catalyst is preferably at most 1.0 part by mass, particularly preferably from 0.005 to 1.0 part by mass, per 100 parts by mass of the polyol.

A foam stabilizer to form favorable cell structure is used in many cases. As the foam stabilizer, for example, a silicone type foam stabilizer is usually used, and e.g. a fluorine type foam stabilizer may also be used as the case requires. The amount of the foam stabilizer is preferably from 0.1 to 10 parts by mass per 100 parts by mass of the total of the polyol and other high molecular weight active hydrogen compound.

In the present invention, a crosslinking agent may be used. As the crosslinking agent, preferred is a compound having at least two active hydrogen-containing groups selected from a hydroxyl group, a primary amino group and a secondary amino group. The number of the active hydrogen-containing groups is preferably from 2 to 8. Two crosslinking agents and more may be used together. The molecular weight per active hydrogen-containing group is preferably less than 1,000, particularly preferably at most 600. It is most preferably at most 300.

Specific examples thereof include compounds such as ethylene glycol, propylene glycol, 1,4-butanediol, neopentyl glycol, 1,6-hexanediol, diethylene glycol, triethylene glycol, dipropylene glycol, glycerol, trimethylolpropane, pentaerythritol, diglycerol, dextrose, sorbitol, sucrose, monoethanolamine, diethanolamine, triethanolamine, bisphenol A, ethylenediamine, 3,5-diethyl-2,4 (or 2,6)-diaminotoluene (DETDA), 2-chloro-p-phenylenediamine (CPA), 3,5-bis(methylthio)-2,4 (or 2,6)-diaminotoluene, 1-trifluoromethyl-3,5-diaminobenzene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis(aminomethyl)cyclohexane and isophorone diamine, and compounds obtained by adding a relatively small amount of an alkylene oxide thereto.

The amount of the crosslinking agent is preferably from 0.1 to 10 parts by mass per 100 parts by mass of the polyol.

In the production method of the flexible foam of the present invention, another additive may be used as the case requires. Said another additive may, for example, be a surfactant such as an emulsifying agent or a foam stabilizer, an aging preventing agent such as an antioxide or a ultraviolet ray absorbent, a filler such as calcium carbonate or barium sulfate, or a known additive such as a flame retardant, a plasticizer, a colorant or an antifungal agent.

The material for production of the flexible foam of the present invention is used as a material system. The material system is usually composed of two components of a liquid obtained by mixing all the materials except for the polyisocyanate compound (called polyol system liquid) and a polyisocyanate compound material liquid. The polyol system contains the above-described polyol and the blowing agent, and a urethane formation accelerating catalyst, the foam stabilizer, the crosslinking agent and other additives, as the case requires. In some cases, it may be composed of three or more components so that the urethane formation accelerating catalyst or a cell opener (usually dispersed or dissolved in part of the polyol) is employed as another component.

As the method of forming a flexible foam, a method of pouring the material system directly into a mold by means of a low pressure foaming machine or a high pressure foaming machine and subjecting it to a reaction or a method of pouring a reactive mixture into an open mold, is preferred.

The high pressure foaming machine is preferably a usual type of mixing two components of the material system. In a case where the material system is composed of at least three components, it is possible to form a reactive mixture by at least three components, followed by pouring. The flexible foam of the present invention may be produced either by a cold curing method or a hot curing method, but a cold curing method is preferred. The production conditions of the flexible foam of the present invention are not particularly limited so long as a flexible foam can be produced under the conditions. For example, a polyisocyanate compound component and a polyol system liquid of the material system are adjusted to a temperature of from 15 to 40° C., respectively, the polyol system liquid and the polyisocyanate compound component are mixed by means of a high pressure foaming machine, and the mixture is immediately poured and closed in a mold heated to from 30 to 80° C. and reacted for from 4 to 20 minutes, to produce a flexible foam.

The comfort to ride in (dynamic seat feeling) of the flexible foam of the present invention can be evaluated by the resonance frequency. Specifically, the resonance frequency is preferably at most 3.6 Hz, more preferably at most 3.5 Hz. The durability of the flexible foam of the present invention can be evaluated by the permanent compression set. The dry heat permanent compression set is preferably at most 5%, more preferably at most 4%, and the heat and humid permanent compression set is preferably at most 14%, more preferably at most 13%.

The flexible foam obtained by the present invention is useful for e.g. a cushion or a seat, and it is particularly suitable as a seat for vehicles such as automobiles.

Now, the present invention will be explained in further detail with reference to Examples. However, it should be understood that the present invention is by no means restricted to such specific Examples.

Values in foaming formulation in Examples and Comparative Examples represent part(s) by mass.

Of the polyol used in Examples and Comparative Examples, the content (unit: mass %) of an oxypropylene block chain adjacent to the initiator (hereinafter referred to as "PO part"), the content (unit: mass %) of an oxyethylene/oxypropylene random chain (hereinafter referred to as "random part", the oxyethylene group content (unit: mass %) at the random part (hereinafter referred to as "EO amount"), the content (unit: mass %) of an oxyethylene block chain at the terminal (hereinafter referred to as "EO part"), the hydroxyl value (unit: mgKOH/g) and the degree of unsaturation (unit: meq/q) are shown in Table 1. The degree of unsaturation was measured by a method in accordance with JIS K1557.

In Production Examples of a polyol, a DMC-METB complex catalyst is meant for a zinc hexacyanocobaltate-monoethylene glycol mono-tert-butyl ether complex catalyst, a KOH catalyst is meant for a potassium hydroxide catalyst, and a CsOH catalyst is meant for a cesium hydroxide catalyst.

Initiator 1: A compound having a hydroxyl value of 168 mgKOH/g obtained by adding propylene oxide to glycerol.

Initiator 2: A compound having a hydroxyl value of 224 mgKOH/g obtained by adding propylene oxide to pentaerythritol.

Production of Polyol A 4,229 g of an ethylene oxide/propylene oxide mixture containing 8 mass % of ethylene oxide was subjected to a reaction by using a DMC-METB complex catalyst in the presence of 1,000 g of the initiator 1 at about 120° C., and then 1,071 g of ethylene oxide was reacted therewith by using a KOH catalyst at about 120° C., and the polymerization was completed. After the reaction, a treatment with an adsorbent (synthetic magnesium silicate) and filtration were carried out to obtain a polyol A having a hydroxyl value of 29 mgKOH/g.

Production of Polyol B1

2,466 g of propylene oxide was subjected to a reaction by using a DMC-METB complex catalyst in the presence of 1,000 g of the initiator 1 at about 120° C., and then 1,881 g of an ethylene oxide/propylene oxide mixture containing 11.2 mass % of ethylene oxide was reacted therewith at about 120° C., then 871 g of ethylene oxide was reacted therewith by using a KOH catalyst at about 120° C., and the production was completed. After the reaction, a treatment with an adsorbent (synthetic magnesium silicate) and filtration were carried out to obtain a polyol B1 having a hydroxyl value of 28 mgKOH/g.

Production of Polyol B2

2,279 g of propylene oxide was subjected to a reaction by using a DMC-METB complex catalyst in the presence of 1,000 g of the initiator 1 at about 120° C., and then 2,278 g of an ethylene oxide/propylene oxide mixture containing 14.4 mass % of ethylene oxide was reacted therewith at about 120° C., then 905 g of ethylene oxide was reacted therewith by using a KOH catalyst at about 120° C., and the production was completed. After the reaction, a treatment with an adsorbent (synthetic magnesium silicate) and filtration were carried out to obtain a polyol B2 having a hydroxyl value of 28 mgKOH/g.

Production of Polyol B3

1,525 g of propylene oxide was subjected to a reaction by using a DMC-METB complex catalyst in the presence of 1,000 g of the initiator 1 at about 120° C., and then 2,833 g of an ethylene oxide/propylene oxide mixture containing 11.6 mass % of ethylene oxide was reacted therewith at about 120° C., then 1,097 g of ethylene oxide was reacted therewith by using a KOH catalyst at about 120° C., and the production was completed. After the reaction, a treatment with an adsorbent (synthetic magnesium silicate) and filtration were carried out to obtain a polyol B3 having a hydroxyl value of 28 mgKOH/g.

Production of Polyol C 4,211 g of an ethylene oxide/propylene oxide mixture containing 7.5 mass % of ethylene oxide was subjected to a reaction by using a DMC-METB complex catalyst in the presence of 1,000 g of the initiator 1 at about 120° C., and then 1,067 g of ethylene oxide was reacted therewith by using a KOH catalyst at about 120° C., and the polymerization was completed. After the reaction, a treatment with an adsorbent (synthetic magnesium silicate) and filtration were carried out to obtain a polyol C having a hydroxyl value of 28 mgKOH/g.

Production of Polyol E 4,292 g of propylene oxide was subjected to a reaction by using a CsOH catalyst in the presence of 1,000 g of the initiator 1 at about 120° C., and then 1,008 g of ethylene oxide was reacted therewith at about 120° C., and the polymerization was completed. After the reaction, a treatment with an adsorbent (synthetic magnesium silicate) and filtration were carried out to obtain a polyol E having a hydroxyl value of 27.9 mgKOH/g.

Production of Polyol F 4,865 g of propylene oxide was subjected to a reaction by using a DMC-METB complex catalyst in the presence of 1,000 g of the initiator 1 at about 120° C., and then 1,117 g of ethylene oxide was reacted therewith by using a KOH catalyst at about 120° C., and the polymerization was completed. After the reaction, a treatment with an adsorbent (synthetic magnesium silicate) and filtration were carried out to obtain a polyol F having a hydroxyl value of 24.8 mgKOH/g.

Production of Polyol G1

5,177 g of propylene oxide was subjected to a reaction by using a KOH catalyst in the presence of 1,000 g of the initiator 1 at about 110° C., and then 1,143 g of ethylene oxide was reacted therewith at about 120° C., and the polymerization was completed. After the reaction, a treatment with an adsorbent (synthetic magnesium silicate) and filtration were carried out to obtain a polyol G1 having a hydroxyl value of 27.8 mgKOH/g.

Production of Polyol G2

7,539 g of propylene oxide was subjected to a reaction by using a KOH catalyst in the presence of 1,000 g of the initiator 2 at about 110° C., and then 1,320 g of ethylene oxide was reacted therewith at about 120° C., and the polymerization was completed. After the reaction, a treatment with an adsorbent (synthetic magnesium silicate) and filtration were carried out to obtain a polyol G2 having a hydroxyl value of 28.2 mgKOH/g.

Production of Polyol G3

5,024 g of propylene oxide was subjected to a reaction by using a KOH catalyst in the presence of 1,000 g of the initiator 1 at about 110° C., and then 1,296 g of ethylene oxide was reacted therewith at about 120° C., and the polymerization was completed. After the reaction, a treatment with an adsorbent (synthetic magnesium silicate) and filtration were carried out to obtain a polyol G3 having a hydroxyl value of 28.3 mgKOH/g.

Production of Polyol G4

5,078 g of propylene oxide was subjected to a reaction by using a KOH catalyst in the presence of 1,000 g of the initiator 1 at about 110° C., and then 1,257 g of ethylene oxide was reacted therewith at about 120° C., and the production was completed. After the reaction, a treatment with an adsorbent (synthetic magnesium silicate) and filtration were carried out to obtain a polyol G4 having a hydroxyl value of 27.6 mgKOH/g.

Production of Polyol G5

4,462 g of propylene oxide was subjected to a reaction by using a KOH catalyst in the presence of 1,000 g of the initiator 1 at about 110° C., and then 788 g of ethylene oxide was reacted therewith at about 120° C., and the production was completed. After the reaction, a treatment with an adsorbent (synthetic magnesium silicate) and filtration were carried out to obtain a polyol G5 having a hydroxyl value of 34 mgKOH/g.

Properties of the obtained polyols A to G5 are shown in Table 1.

TABLE 1

| Polyol | PO part content | Random part Content | Random part EO amount | EO part content | Number of Hydroxyl groups | Hydroxyl value | Degree of unsaturation |
|---|---|---|---|---|---|---|---|
| A | — | 67.1 | 8 | 17 | 3 | 29 | 0.016 |
| B1 | 39.3 | 30.3 | 11.2 | 14 | 3 | 28 | 0.015 |
| B2 | 35.3 | 35.3 | 14.4 | 14 | 3 | 28 | 0.016 |
| B3 | 23.6 | 43.9 | 11.6 | 17 | 3 | 28 | 0.017 |
| C | — | 67.1 | 7.5 | 17 | 3 | 28 | 0.016 |
| E | 68.1 | — | — | 16 | 3 | 27.9 | 0.018 |
| F | 69.7 | — | — | 16 | 3 | 24.8 | 0.020 |
| G1 | 70.7 | — | — | 15.6 | 3 | 27.8 | 0.060 |
| G2 | 76.5 | — | — | 13.4 | 4 | 28.2 | 0.063 |
| G3 | 68.6 | — | — | 17.7 | 3 | 28.3 | 0.058 |
| G4 | 69.2 | — | — | 17.1 | 3 | 27.6 | 0.059 |
| G5 | 71.4 | — | — | 12.6 | 3 | 34 | 0.057 |

EXAMPLES 1 to 5 AND COMPARATIVE EXAMPLES 1 to 4

A flexible foam was produced by using materials shown in Table 2 in an amount shown in Table 3 (numerals represent part(s) by mass). Among the materials, a polyol system liquid and a polyisocyanate compound were respectively adjusted to have a liquid temperature of 25±1° C., the polyisocyanate compound was added in a predetermined amount to the polyol system liquid, followed by mixing with stirring by a high-speed mixer for 5 seconds, and the mixture was immediately poured and closed in an aluminum mold in a size of 400 mm lengthwise and breadthwise and 100 mm in height, heated to 60° C. After curing for 6 minutes, a flexible foam was taken out and left to stand for at least 24 hours, and then various physical properties were measured. The measurement results are shown in Table 3. Here, the measurement methods of the foam physical properties were in accordance with the following methods, and with regard to the core density, one cut into a size of 100 mm lengthwise and breadthwise and 50 mm in height, having the skin portion removed from the center portion of the foam, was used for measurement. With regard to the resonance frequency, there is a correlation between the molded foam for test piece having a size of 400 mm lengthwise and breadthwise and 100 mm in height and an actual molded foam for seat cushion, and the actual molded foam tends to have a resonance frequency higher than that of the test piece by from about 0.2 to about 1 Hz, depending upon e.g. the thickness and shape in general. The degree of unsaturation in Table 3 is the degree of total unsaturation of the polyol or the base polyol in the polymer dispersed polyol, and the unit is meq/g.

The static spring constant obtained by carrying out a load test with regard to a box mold test piece (size: 400 mm lengthwise and breadthwise and 100 mm in height) of each of the foams produced in Examples 1 to 5 and Comparative Examples 1 to 4, the X value calculated from the formula (1), the static spring constant obtained by carrying out a load test with regard to the core (size: 100 mm lengthwise and breadthwise and 50 mm in height) of each of the foams, and the Y value calculated from the formula (2) are shown in Table 3.

Further, with respect to the comfort to sit on, human sensely evaluation was carried out. A person actually sat on each of the flexible foams of Examples 1 to 5 and Comparative Examples 1 to 4, and the comfort to sit on (feeling of support) at the initial stage of sitting and the feeling of bottom out were evaluated in three grades of X: very poor, Δ: poor and ◯: good.

Now, standards used for measurement of the physical properties of the flexible foam are shown below.

Overall density (unit: kg/m3), core density (unit: $kg/m^3$), 25%-ILD hardness (unit: $N/314\ cm^2$), core impact resilience coefficient (unit: %), tear strength (N/cm), tensile strength (kPa), elongation (%), dry heat permanent compression set (unit: %) and heat and humidity permanent compression set (unit: %) were measured by methods in accordance with JIS K6400. Hysteresis loss (unit: %) was measured by a method in accordance with JASO B407-87. Resonance frequency (unit: Hz) and transmissibility at 6 Hz were measured by methods in accordance with JASO B407-87 (excitation amplitude: ±2.5 mm, pressing plate: iron abrasive plate, load: 490 N). Static spring constant (unit: N/mm) and deflection (unit: mm) were measured by methods in accordance with JASO B408-89.

TABLE 2

| | |
|---|---|
| Cross linking agent a1 | Propylene oxide/ethylene oxide addition product of sorbitol, hydroxyl value: 450 mgKOH/g |
| Crosslinking agent a2 | Diethanolamine |
| Catalyst b1 | Dipropylene glycol (DPG) solution of triethylenediamine (TEDA L-33, tradename, manufactured by TOSOH CORPORATION) |
| Catalyst b2 | DPG solution of bis-[(2-dimethylamino)ethyl]ether (TOYOCAT ET, tradename, manufactured by TOSOH CORPORATION) |
| Foam stabilizer c1 | Silicone foam stabilizer (SRX-274C, tradename, manufactured by TORAY SILICONE) |
| Foam stabilizer c2 | Silicone foam stabilizer (L-5309, tradename, manufactured by Nippon Unicar Company Limited) |
| Foam stabilizer c3 | Silicone foam stabilizer (L-3601, tradename, manufactured by Nippon Unicar Company Limited) |
| Blowing agent | Water |
| Polyol J | Polymer dispersed polyol wherein acrylonitrile/styrene copolymer particles (20 mass %) are dispersed in polyol G4 (80 mass %) as a dispersion medium |
| Polyol K | Polymer dispersed polyol wherein acrylonitrile/styrene copolymer particles (35 mass %) are dispersed in polyol G5 (65 mass %) as a dispersion medium |
| Polyisocyanate | Mixture of TDI-80 (mixture of 2,4-TDI/2,6-TDI = 80/20 mass %)/crude MDI = 80/20 mass %, isocyanate group content: 44.8 mass % (Coronate 1021, tradename, manufactured by NIPPON POLYURETHANE INDUSTRY CO., LTD.) |

TABLE 3

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| Polyol | A:60 K:40 | B1:60 J:40 | B2:60 J:40 | B3:60 J:40 | C:50 K:50 | E:60 K:40 | G1:60 K:40 | G2:42 G3:18 J:40 | F:60 J:40 |
| Degree of unsaturation | 0.028 | 0.030 | 0.031 | 0.032 | 0.032 | 0.030 | 0.059 | 0.061 | 0.034 |
| Crosslinking agent a1 | 3.0 | 3.0 | 3.0 | 3.0 | 2.0 | 3.0 | 3.0 | 4.0 | 3.0 |
| Crosslinking agent a2 | 2.0 | 1.0 | 1.0 | 1.0 | 0.2 | 2.0 | 2.0 | — | 2.0 |
| Catalyst b1 | 0.50 | 0.50 | 0.50 | 0.50 | 0.45 | 0.50 | 0.50 | 0.50 | 0.50 |
| Catalyst b2 | 0.12 | 0.12 | 0.12 | 0.12 | 0.05 | 0.12 | 0.12 | 0.1 | 0.12 |
| Foam stabilizer c1 | 1.0 | — | — | — | — | 1.0 | 1.0 | — | 1.0 |
| Foam stabilizer c2 | — | 1.0 | 1.0 | 1.0 | 0.9 | — | — | 0.6 | — |
| Foam stabilizer c3 | — | — | — | — | 0.3 | — | — | 0.4 | — |
| Blowing agent | 3.0 | 3.0 | 3.0 | 3.0 | 4.1 | 3.0 | 3.0 | 3.9 | 3.0 |
| Isocyanate index | 105 | 105 | 105 | 105 | 105 | 105 | 105 | 105 | 105 |
| Overall density | 49.1 | 49.1 | 48.7 | 49.1 | 38.5 | 49.2 | 49.9 | 39.8 | 46.9 |
| Core density | 42.5 | 43.2 | 42.6 | 42.5 | 35.4 | 43.2 | 42.7 | 37.0 | 42.2 |
| 25%-ILD hardness | 278 | 215 | 206 | 278 | 221 | 223 | 203 | 190 | 185 |
| Core impact resilience coefficient | 68 | 66 | 64 | 68 | 60 | 68 | 66 | 65 | 65 |
| Dry heat permanent compression set | 3.4 | 3.8 | 3.1 | 3.4 | 4.0 | 3.2 | 2.8 | 3.9 | 4.3 |
| Heat and humidity permanent compression set | 13.7 | 12.5 | 11.3 | 13.7 | 14.0 | 12.8 | 12.1 | 23.7 | 16.8 |
| Resonance frequency | 3.43 | 3.43 | 3.40 | 3.43 | 3.50 | 3.40 | 3.43 | 3.70 | 3.80 |
| Transmissibility at 6 Hz | 0.73 | 0.72 | 0.73 | 0.73 | 0.88 | 0.75 | 0.80 | 0.90 | 1.1 |
| Hysteresis loss | 19.9 | 20.6 | 18.9 | 19.9 | 23.0 | 19.1 | 18.1 | 24.9 | 18.8 |
| Static spring constant (overall) | | | | | | | | | |
| 98N | 18.5 | 15.1 | 13.4 | 20.0 | 15.7 | 9.11 | 6.57 | 6.67 | 7.25 |
| 883N | 54.5 | 49.0 | 54.5 | 46.6 | 44.6 | 54.5 | 57.6 | 57.6 | 61.3 |
| X value | 2.94 | 3.25 | 4.06 | 2.33 | 2.84 | 5.98 | 8.77 | 8.64 | 8.45 |

TABLE 3-continued

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
| --- | --- | --- | --- | --- | --- | --- | --- | --- | --- |
| Static spring constant (core) | | | | | | | | | |
| 19.6N | 10.3 | 7.84 | 7.55 | 8.13 | 8.52 | 7.25 | 8.13 | 6.37 | 4.80 |
| 127.4N | 13.0 | 11.7 | 12.5 | 9.00 | 15.1 | 13.8 | 15.8 | 15.8 | 16.4 |
| Y value | 1.27 | 1.49 | 1.66 | 1.11 | 1.77 | 1.91 | 1.94 | 2.48 | 3.42 |
| Comfort to sit on | ◯ | ◯ | ◯ | ◯ | ◯ | Δ | X | X | X |

The flexible foams of Examples 1 to 5 are flexible foams which satisfy an X value of at most 4.2 and a Y value of at most 1.8 and provide favorable comfort to sit on. Namely, with respect to the load-deflection loop in the load application initial stage, the curve quickly rises and the static spring constant is high, and the feeling of support is sufficient. In the high load region, the static spring constant is low, and the feeling of bottom out is overcome. Actually, the results of the evaluation of the comfort to sit on by sense are favorable. Further, the flexible foams of Examples 1 to 5 have favorable physical properties such as moldability, vibrating property and durability. Further, a favorable flexible foam can be obtained even when the density is low, as in Example 5.

The flexible foams of Comparative Examples 1 to 4 are flexible foams having an X value of at least 4.2 and a Y value of at least 1.8, thereby providing unfavorable comfort to sit on. Namely, with respect to the load-deflection loop in the load application initial stage, the curve does not quickly rise, and the static spring constant is low, and the feeling of support is insufficient. In the high load region, the static spring constant is high as compared with Examples, and the feeling of bottom out is not sufficiently overcome. Actually, the results of evaluation of the comfort to sit on by sense are not favorable. The comfort to sit on such as vibrating property is also deteriorated in Comparative Examples 3 and 4.

The present invention provides a flexible polyurethane foam which exhibits a characteristic load-deflection loop in a load test, and when the foam which exhibits such a characteristic loop is used as a seat cushion for an automobile, favorable comfort to sit on such that the feeling of support at the initial stage of sitting is favorable and the feeling of bottom out is overcome, can be obtained. Further, the flexible polyurethane foam is excellent also in e.g. vibrating property and durability, and is useful as a cushion sheet for an automobile.

The entire disclosure of Japanese Patent Application No. 2001-238125 filed on Aug. 6, 2001 including specification, claims, drawings and summary are incorporated herein by reference in its entirety.

What is claimed is:

1. A flexible polyurethane foam, wherein in a load (N)-deflection (mm) loop obtained by a load test of the flexible polyurethane foam, the X value as calculated from the formula (1) is at most 4.2:

$$X = \text{(static spring constant at a load of 883N)}/\text{(static spring constant at a load of 98N)} \quad (1).$$

2. A flexible polyurethane foam, wherein in a load (N)-deflection (mm) loop obtained by a load test of a core portion of the flexible polyurethane foam, the Y value as calculated from the formula (2) is at most 1.8:

$$Y = \text{(static spring constant at a load of 127.4N)}/\text{(static spring constant at a load of 19.6N)} \quad (2).$$

3. A method for producing the flexible polyurethane foam as defined in claim 1, which comprises reacting a polyol having from 5 to 85 mass % of an oxyethylene/oxypropylene random chain, the oxyethylene group content in the random chain being from 3 to 40 mass % and the content of the terminal oxyethylene block chain being from 3 to 40 mass %, and having a hydroxyl value of from 10 to 56 mgKOH/g and a degree of unsaturation of at most 0.04 meq/g, with a polyisocyanate in the presence of a blowing agent and a catalyst.

4. The method for producing the flexible polyurethane foam according to claim 3, wherein as the blowing agent, at least one blowing agent selected from the group consisting of water and inert gases is used.

5. The method for producing the flexible polyurethane foam according to claim 3, wherein as the polyisocyanate, an aromatic polyisocyanate compound is used.

6. A method for producing the flexible polyurethane foam as defined in claim 2, which comprises reacting a polyol having from 5 to 85 mass % of an oxyethylene/oxypropylene random chain, the oxyethylene group content in the random chain being from 3 to 40 mass % and the content of the terminal oxyethylene block chain being from 3 to 40 mass %, and having a hydroxyl value of from 10 to 56 mgKOH/g and a degree of unsaturation of at most 0.04 meq/g, with a polyisocyanate in the presence of a blowing agent and a catalyst.

7. The method for producing the flexible polyurethane foam according to claim 6, wherein as the blowing agent, at least one blowing agent selected from the group consisting of water and inert gases is used.

8. The method for producing the flexible polyurethane foam according to claim 6, wherein as the polyisocyanate, an aromatic polyisocyanate compound is used.

9. A material system for production of the flexible polyurethane foam as defined in claim 1, which comprises a polyol system liquid containing a polyol having from 5 to 85 mass % of an oxyethylene/oxypropylene random chain, the oxyethylene group content in the random chain being from 3 to 40 mass % and the content of the terminal oxyethylene block chain being from 3 to 40 mass %, and having a hydroxyl value of from 10 to 56 mgKOH/g and a degree of unsaturation of at most 0.04 meq/g, and a polyisocyanate.

10. The material system for production of the flexible polyurethane foam according to claim 9, wherein as a blowing agent, at least one blowing agent selected from the group consisting of water and inert gases is used.

11. The material system for production of the flexible polyurethane foam according to claim 9, wherein as the polyisocyanate, an aromatic polyisocyanate compound is used.

12. A material system for production of the flexible polyurethane foam as defined in claim 2, which comprises a polyol system liquid containing a polyol having from 5 to 85 mass % of an oxyethylene/oxypropylene random chain, the oxyethylene group content in the random chain being from 3 to 40 mass % and the content of the terminal oxyethylene block chain being from 3 to 40 mass %, and having a hydroxyl value of from 10 to 56 mgKOH/g and a degree of unsaturation of at most 0.04 meq/g, and a polyisocyanate.

13. The material system for production of the flexible polyurethane foam according to claim 12, wherein as a blowing agent, at least one blowing agent selected from the group consisting of water and inert gases is used.

14. The material system for production of the flexible polyurethane foam according to claim 12, wherein as the polyisocyanate, an aromatic polyisocyanate compound is used.

15. A flexible polyurethane foam, wherein in a load (N)-deflection (mm) loop obtained by a load test of the flexible polyurethane foam, the X value as calculated from the formula (1) is at most 4.2:

$$X=\text{(static spring constant at a load of 883N)/(static spring constant at a load of 98N)} \quad (1)$$

and wherein in a load (N)-deflection (mm) loop obtained by a load test of a core portion of the flexible polyurethane foam, the Y value as calculated from the formula (2) is at most 1.8:

$$Y=\text{(static spring constant at a load of 127.4N)/(static spring constant at a load of 19.6N)} \quad (2).$$

16. The method according to claim 3, wherein the polyol is from 10 to 80 mass % of an oxyethylene/oxypropylene random chain, the oxyethylene group content in the random chain is from 5 to 20 mass %, the terminal oxyethylene block chain is from 5 to 30 mass %, the hydroxyl value is from 10 to 45 mgKOH/g, and the degree of unsaturation is at most 0.035 meq/g.

17. The material systems according to claim 9, wherein the polyol is from 10 to 80 mass % of an oxyethylene/oxypropylene random chain, the oxyethylene group content in the random chain is from 5 to 20 mass %, the terminal oxyethylene block chain is from 5 to 30 mass %, the hydroxyl value is from 10 to 45 mgKOH/g, and the degree of unsaturation is at most 0.035 meq/g.

18. The material system according to claim 12, wherein the polyol is from 10 to 80 mass % of an oxyethylene/oxypropylene random chain, the oxyethylene group content in the random chain is from 5 to 20 mass %, the terminal oxyethylene block chain is from 5 to 30 mass %, the hydroxyl value is from 10 to 45 mgKOH/g, and the degree of unsaturation is at most 0.035 meq/g.

19. The flexible polyurethane foam according to claim 1, wherein X is at most 4.1.

20. The flexible polyurethane foam according to claim 1, wherein X is at most 4.0.

21. The flexible polyurethane foam according to claim 1, wherein X is at most 3.9.

22. The flexible polyurethane foam according to claim 2, wherein Y is at most 1.75.

23. The flexible polyurethane foam according to claim 2, wherein Y is at most 1.7.

24. The flexible polyurethane foam according to claim 2, wherein Y is at most 1.68.

25. The flexible polyurethane foam according to claim 1, having a core impact resilience coefficient of 60–68.

26. The flexible polyurethane foam according to claim 2, having a core impact resilience coefficient of 60–68.

27. The flexible polyurethane foam according to claim 15, having a core impact resilience coefficient of 60–68.

* * * * *